(12) United States Patent
Hermet et al.

(10) Patent No.: US 6,498,961 B1
(45) Date of Patent: Dec. 24, 2002

(54) METHOD FOR MAKING AND REPRODUCING AT LEAST PART OF AN OBJECT OR A PERSON

(75) Inventors: Bernard Hermet, Viarmes (FR); Bernard Simon, Champagne sur Oise (FR)

(73) Assignee: UMH Universal Master's Head S.A. (FR)

( * ) Notice: Subject to any disclaimer, the term of this patent is extended or adjusted under 35 U.S.C. 154(b) by 0 days.

(21) Appl. No.: 09/534,425

(22) Filed: Mar. 23, 2000

Related U.S. Application Data

(63) Continuation of application No. PCT/FR98/02085, filed on Sep. 29, 1998.

(30) Foreign Application Priority Data

Sep. 29, 1997 (FR) .............................. 97 12310

(51) Int. Cl.[7] .................. G06F 19/00; B44C 1/20
(52) U.S. Cl. .................. 700/118; 700/98; 156/232
(58) Field of Search .................. 700/98, 118, 161, 700/163; 156/232

(56) References Cited

U.S. PATENT DOCUMENTS

| 3,988,520 A | | 10/1976 | Riddle | |
|---|---|---|---|---|
| 4,491,494 A | * | 1/1985 | Davis et al. | 156/240 |
| 4,675,746 A | * | 6/1987 | Tetrick et al. | 347/129 |
| 5,280,305 A | | 1/1994 | Monroe et al. | |
| 5,363,159 A | | 11/1994 | Melvin | |
| 5,398,395 A | * | 3/1995 | Woolls | 156/521 |
| 5,736,201 A | * | 4/1998 | Flint | 427/256 |
| 5,926,388 A | * | 7/1999 | Kimbrough et al. | 118/681 |
| 6,157,865 A | * | 12/2000 | Cromett | 63/20 |

FOREIGN PATENT DOCUMENTS

| EP | 0 244 636 | 11/1987 |
|---|---|---|
| WO | 83 04114 A | 11/1983 |
| WO | 94 27198 A | 11/1994 |

* cited by examiner

*Primary Examiner*—Leo Picard
*Assistant Examiner*—Elliot L Frank
(74) *Attorney, Agent, or Firm*—Wall Marjama & Bilinski LLP

(57) ABSTRACT

A method of manufacturing a three dimensional reproduction of an article having recesses and relief sections by taking photographs of the article and digitalizing the information. The information is used to produce a volumetric body of the article and an anamorphosed image of the article containing color and texture data. The image is placed on a heat shrinkable material which is applied to the body in symbiotic relationship therewith so that the anamorphosed image becomes undistorted when shrink fitted to the body.

5 Claims, 4 Drawing Sheets

METHOD FOR MAKING AND REPRODUCING AT LEAST PART OF AN OBJECT OR A PERSON

CROSS REFERENCE TO RELATED APPLICATION

This is a continuation application of International Application PCT/FR98/02085, with an international filing date of Sep. 29, 1998.

BACKGROUND OF THE INVENTION

The invention relates to the technical field of the reproduction and manufacture of individuals, particularly in the form of busts and/or of statuettes.

It is known to produce statuettes, busts, cartoon figures and sculptures of various people who are to a greater or lesser extent known and/or famous in various environments, both sporting and cultural, political, etc. The shape of the face and the morphological volume of the person to be reproduced can be obtained from photographs or drawings or from the person himself. In general, the methods used, which are of an essentially small-scale manual nature, provide merely the "spirit" of the person and his characteristic features, but are in no way capable of producing a three-dimensional image corresponding exactly to the person in terms of both proportions and features.

In other words, the techniques of reproducing a person in three dimensions do not make it possible to reconstruct a perfectly true and authentic image of the person in the same way as a photograph is capable of doing where a reproduction in two dimensions is concerned. It is also apparent that most statuettes or busts of persons are of uniform color. When coloring is desired, it is necessary to resort to entirely manual methods which, at most, can never correspond to the texture and color of the skin.

The teaching of Patent EP-A-0244636 discloses a solution suitable for the manufacture of dolls or of similar articles. This document does not seek to achieve a photographic resemblance of an individual. In this prior art, the support receiving an image of the cut-off face is not subjected to an operation capable of allowing it to match perfectly the recessed and relief shapes of a morphometric volume.

Moreover, the prior document makes use of photographs and then of the numbering of these photographs in two independent operations in order to obtain a system for evaluating the gray levels. As will be mentioned in the rest of the description, according to the invention the impression is not transposed directly onto the support formed by the morphological volume, that is to say a volumetric body, but onto a virtual cylinder, the algorithms of which have taken into account the rheology of the material of the impression support.

In the document U.S. Pat. No. 5,280,305, the aim is to make a mask, not reproduce a support, and to provide an anamorphosed image of a previously stored photograph. Here too, in this prior patent, only the front face is produced, not the entire volume of an individual's head.

The set object of the invention is to overcome these disadvantages simply, reliably, effectively and economically.

The problem which the invention proposes to solve is to produce, in particular, busts or statuettes of individuals, its aim being to provide a three-dimensional reproduction of these persons, whilst at the same time preserving the suitability of several parameters, specifically essentially:

the volume, which must have the greatest possible fidelity in its proportions and in its features;

the image, which must have the greatest possible photographic realism;

the color, which must be authentic;

the spirit, which must depict the character and temperament of the person.

In other words, the problem which the invention proposes to solve is to provide a three-dimensional reproduction of a person, particularly of his face, which corresponds to his photographic image, and to the level of volume, morphology, color, etc.

SUMMARY OF THE INVENTION

In order to solve such a problem, a method has been designed and developed for manufacturing and reproducing at least part of an individual or of an object, whereby:

a set of measurements is produced simultaneously, in order to obtain numerical data in the form of a 3D file, of a color texture of the 3D file and of 2D plane color photographs of the individual or of the object;

this data acquisition set is repeated over a plurality of predefined zones, so as to cover the 360° of the individual (or of the object), in order to lay said data onto a modeled morphometric volume;

the image obtained is anamorphosed as a function of the physical transformation characteristics of the modeled volume;

the anamorphosed image is applied to a support made of shrinkable material;

the shrinkable support is shaped in order to obtain a sleeve;

a volumetric body corresponding to the digitized model of the individual is produced;

the sleeve is applied to the relevant part of the individual's body;

the sleeve is subjected to an operation capable of allowing it to match perfectly the recessed and/or relief shapes of the volumetric body.

Bearing in mind the basic characteristics of the invention, the method may be described as follows.

With the aid of a scanner coupled to a CCD camera and a digital photographic instrument, a set of measurements is produced simultaneously, so as to obtain the following numerical data:

3D file color texture of the 3D file 2D plane color photographs of the individual.

This numerical data acquisition set is repeated over a plurality of predefined zones, so as to cover the 360° of the individual, in particular the head. Each digitized set represents one sector of the 360° of the individual.

For processing the 3D numerical data, the fusion of the digitized 3D sectors is carried out, in order to obtain the virtual orbicular volume of the subject. The fusion of the 3D files gives rise to the fusion of the texture associated with said file.

For processing the 2D photographic numerical data by means of specific software, orbicular laying of the 2D photographic sectors onto the virtual 3D volume is carried out by the exact superposition of the photographs on the texture of this file.

A texture of photographic quality in terms of details and of colors of the individual is thus obtained.

For anamorphosis as such, specific software is used to reenter the characteristics of the support made of shrinkable material, which will subsequently be used for manufacturing the physical photographic skin, and also the technical parameters for its transformation, so that a virtual cylinder can be generated for the algorithms corresponding to the rheology of this material.

The cylinder is subsequently positioned virtually around the virtual individual (3D file with photographic texture).

Photographic projection onto the virtual support is then carried out.

The result of this is that the 3D data of the photographic texture are transposed in the form of anamorphosed 2D data onto the virtual cylinder, so as to obtain an anamorphosed virtual 360° pan of the individual.

The virtual cylinder is developed in order to obtain the anamorphosed flat photographic image of the subject over 360°. This image corresponds to the digital impression file which will subsequently be used in order to produce the photographic impression on a support made of shrinkable material.

The physical production of the morphometric volume is obtained by any known means, using, for example, suitable software, in order to calculate, from the 3D digital file, the path of a tool which will control in four axes the production of an imprint of a mold on a machining center.

After the numerical data have been acquired and processed, the photographic skin is produced in the following way:

On the basis of the digital impression file, printing is carried out onto the support made of shrinkable material, for example in the form of a polymeric film.

The printed film is shaped in the form of a cylindrical sleeve corresponding to the virtual cylinder.

The shrinkable cylindrical sleeve is positioned accurately according to the physical and morphometric volume.

The shrinkage of the sleeve is carried out, the latter matching the recessed and/or relief shapes of the morphometric physical volume.

So that the film perfectly matches the morphometric volume, the so-called symbiosing operation is carried out, which involves shaping the film of the sleeve conformally to the volume and putting it into perfect symbiosis with the latter.

BRIEF DESCRIPTION OF THE DRAWINGS

The invention is described in more detail below with the aid of the figures of the drawings in which.

DESCRIPTION OF THE INVENTION

Figure 1:
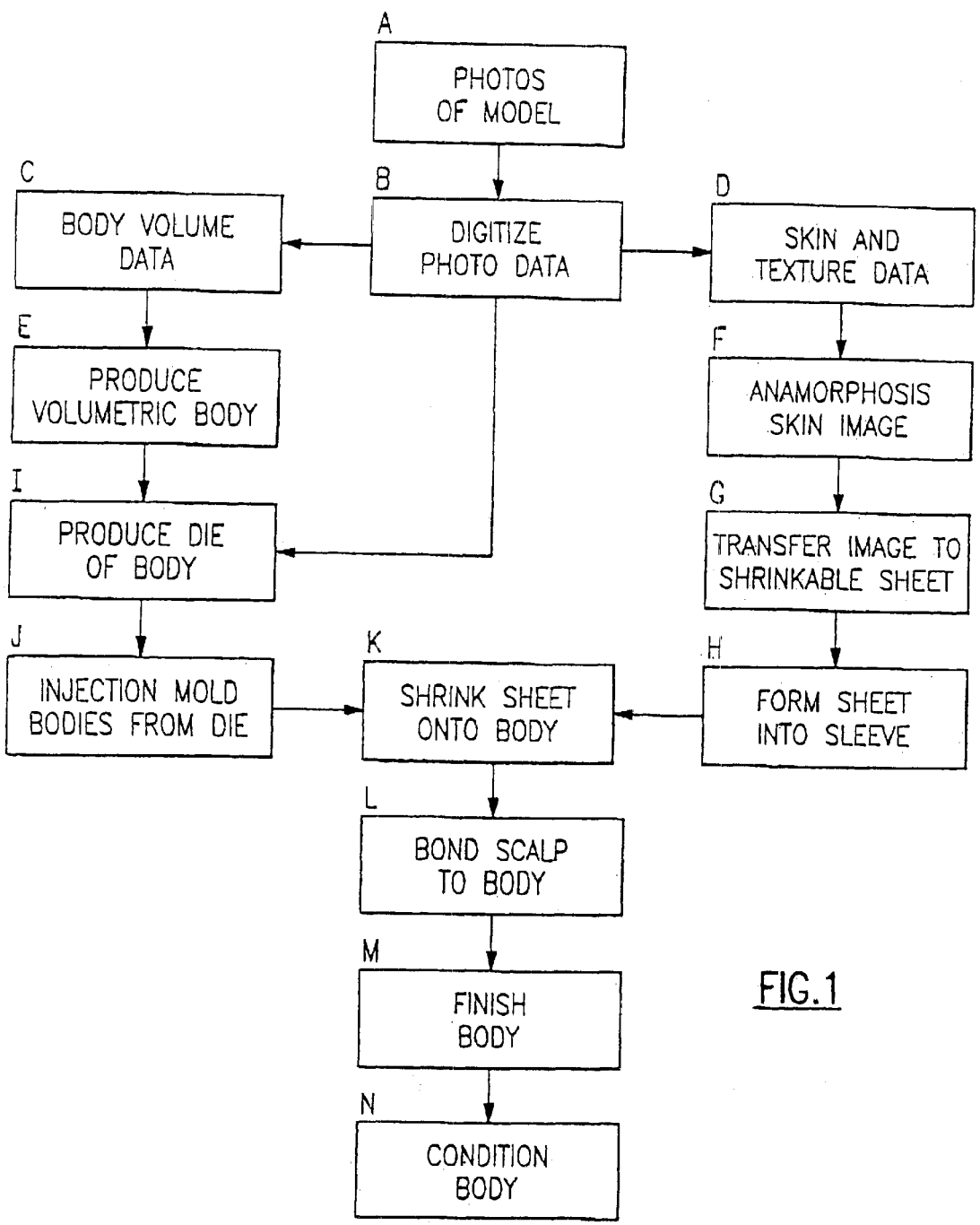
FIG. 1 shows the algorithm of the method according to the invention.

One of the important steps in the method according to the invention is the acquisition of the data of a part of the individual which is to be reproduced, in particular his head, which, of course, is a characteristic part of each individual, this part being unique and being identifiable immediately.

For this purpose, photographs of the person to be reproduced in three dimensions are taken. In general, it is expedient to take a front view, a view of the right side, a view of the left side and, if appropriate, a rear view (Step A).

It is then expedient to carry out digitization of these photographs (Step B), to model a morphological volume (Step C) and to produce a skin texture (Step D) by carrying out anamorphosis, as will be mentioned in the rest of the description. Advantageously, but not in a limiting way, two of the essential elements of the three-dimensional reproduction, to ensure that the latter corresponds perfectly to the reality of the person, specifically his morphometric volume and the skin, are deduced from the same photographs, so that these two elements are in perfect symbiosis.

The modeling of the volume (Step E) can be carried out according to several techniques, depending on the acquisition of the data.

Where persons who have disappeared are concerned, it may be advantageous to resort to the sculpture technique in order, for example, to manufacture the bust and the head according to a panel of photographs. This sculpture makes it possible to produce imprints for manufacturing the mold, for example for the scalp, the head and the bust.

It is also possible to employ the scanner technique. For this purpose, the persons in question undergo the action of a scanner in order to obtain a digital file, making it possible, by means of a numerical machining center, to produce the imprints for manufacturing the various molds necessary (for example, scalp, head and bust). Finally, the use of a specific software is not ruled out, in order to digitize the photographs and transmit the information gathered directly to a machining center, in order, as before, to manufacture the necessary molds (for example, scalp, head and bust). Whatever the technique used, the aim of this Step E is to obtain the real volume of the head (or the like), in order to adapt this volume to the skin texture element perfectly with a very high degree of accuracy.

For this purpose, in order to produce the skin texture, the photomontage and mixing of the photographs are carried out by computerization in order to obtain an image developed over 360° and capable of being laid onto the morphological volumetric body. It is then expedient, in a particularly important way, to anamorphose the image as a function of the volume and of the transformation characteristics of the skin material. The aim is to obtain an authentic resemblance of the face, so that the "skin" is given volume.

The anamorphosed and homothetic image (Step F) is subsequently printed onto an, in particular shrinkable, support (Step G). The support consists, for example, of a heat-shrinkable film.

The aim is to make it possible, by the deformation of the image or of the photograph, to prearrange a third dimension (depth) which will be expressed when the skin is applied to its corresponding morphological volume.

This shrinkable support, by shrinking onto a specific volume corresponding to the image or to the photograph, will match the shapes of said volume and will bring the third dimension into existence. The image or photograph will thus resume its original appearance, but in 3D.

The shrinkable support, printed in this way with the anamorphosed image, is shaped in the form of a sleeve (Step H).

These various characteristic steps of the method according to the invention thus make it possible to print onto a support, for example, as mentioned, a heat-shrinkable film, an anamorphosed image of a previously digitized photograph of the head of the person in question. This sleeve processed in this way is subsequently applied to the morphological volumetric body. As already mentioned, this body is obtained by means of digital reproduction machines which, in a way known perfectly to a person skilled in the art, make a volume conformal to a digital file, as displayed on a computer screen (Step E). At this stage, of course, the volumetric body has a uniform color, in particular white. On the basis of the volumetric body obtained, it is, of course, easy to produce a die from it (Step I) and subsequently to obtain a large number of them, for example by injection-molding (Step J). As an illustrative example, after a computerized three-dimensional mock-up has been executed, an electrode can be manufactured and developed in order to obtain imprints by the electroerosion of an injection-molding tool or by machining on a numerical center, without thereby ruling out other means. The various volumes may be injection-molded, for example with reinforced polymer.

It is then expedient to apply the shrinkable support in the form of a sleeve, onto which the anamorphosed image of the person has been printed, onto the relevant part or parts, in particular, of the volumetric body. In a particularly important way, the shrinkable support film is subjected to an operation capable of allowing it to match perfectly the recessed and relief shapes of the volumetric body.

With the sleeve engaged in this way on the volumetric body, a shrinkage operation is carried out, in combination with a so-called symbiosing operation (Step K). The sleeve may, of course, be laid in place by means of any suitable automatic machine. The same is true of the shrinkage operation as such.

The effect of this so-called symbiosing operation is to shape the heat-shrinkable film or suchlike support conformally to the volumetric body, in such a way that this film matches very accurately the various shapes of the volumetric body and, more particularly, the parts which appear in recessed form. The effect of this so-called symbiosing operation is, therefore, to restretch the skin in the depression zones (recessed zones), in such a way that said skin is laid perfectly, at all points, on the surface of the volumetric body. The result of this is that the skin and the volume are in perfect symbiosis. It is therefore apparent that this so-called symbiosing operation is one of the characteristic steps of the method of the invention. Various techniques can be employed in order to carry out this symbiosing operation. Mention may be made, for example, of the vacuum, suction and electrostatic techniques. It is then sufficient to put in place a previously decorated scalp (Step L).

For example, the scalp is secured to the head by adhesive bonding or the like. It is then expedient to carry out finishing operations (Step M), particularly in order to level off the sleeves at the base of the head and in the upper part of the bust. Finally, (Step N), the conditioning of the finished bust is carried out.

As mentioned, the method according to the invention is used particularly advantageously for producing busts of, in particular, famous persons on an industrial scale, its aim being to provide a three-dimensional reproduction corresponding with high accuracy to the real features and/or characteristics of the person in question, in terms of both the volume and the skin, in order to obtain a kind of cloning of the real person.

The rest of the description summarizes the essential characteristic phases for producing busts, together with their scalp, corresponding to any person.

The term "bust" will designate below the figuring of the head and of a variable part of the upper portion of the human body from the waist to the neck.

Figure 2:
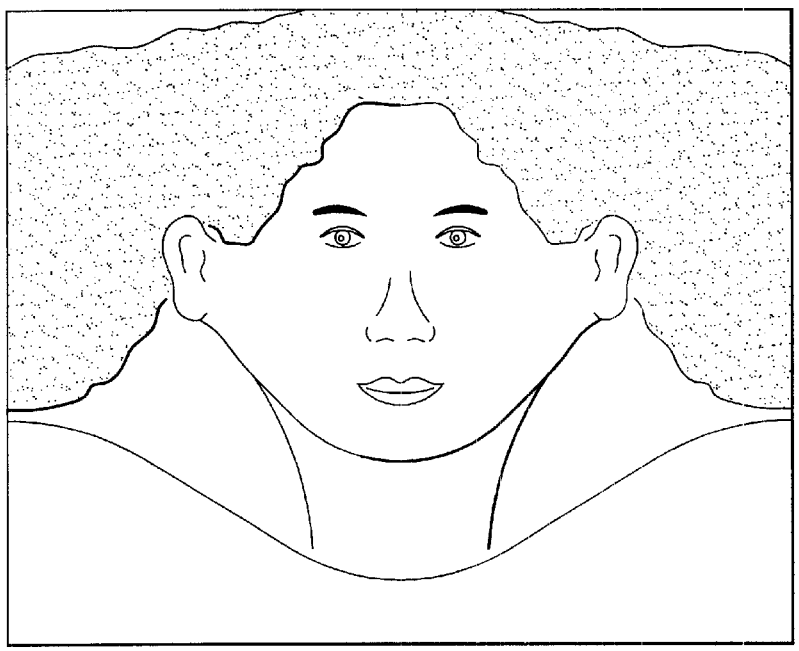
FIGS. 2, 3, 4, 5, 6 and 7 show, in purely diagrammatic views, the main phases in the manufacture of a bust, according to the characteristics of the method of the invention.
Figure 3:
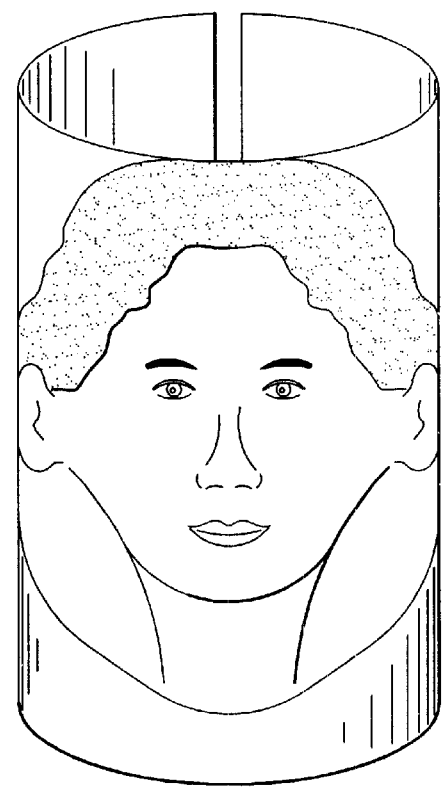
Figure 4:
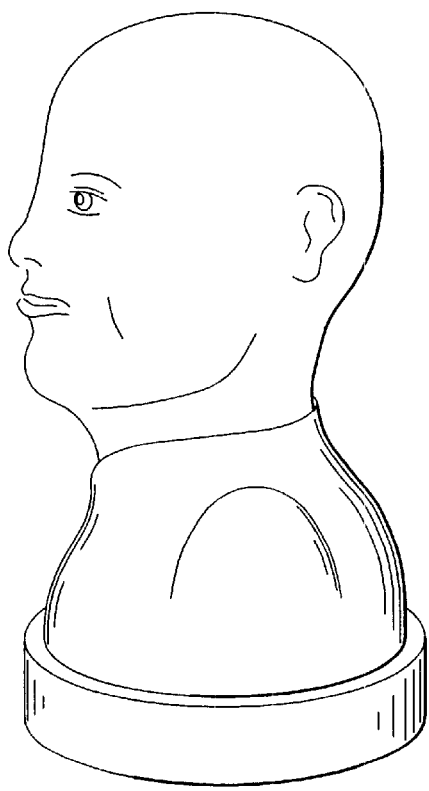
Figure 5:
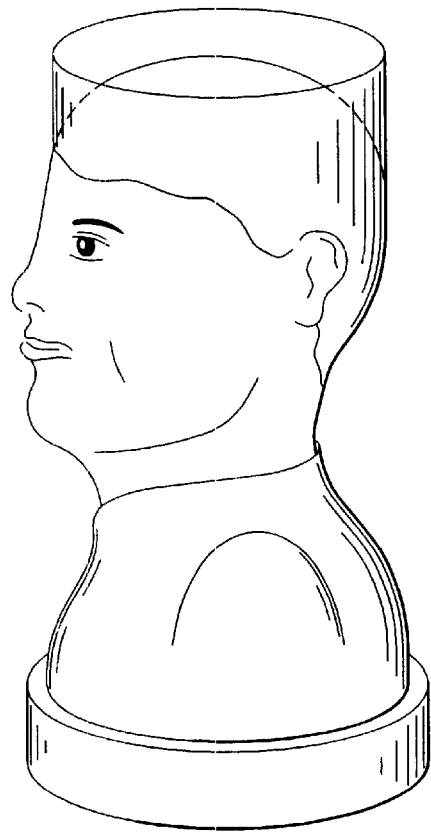
Figure 6:
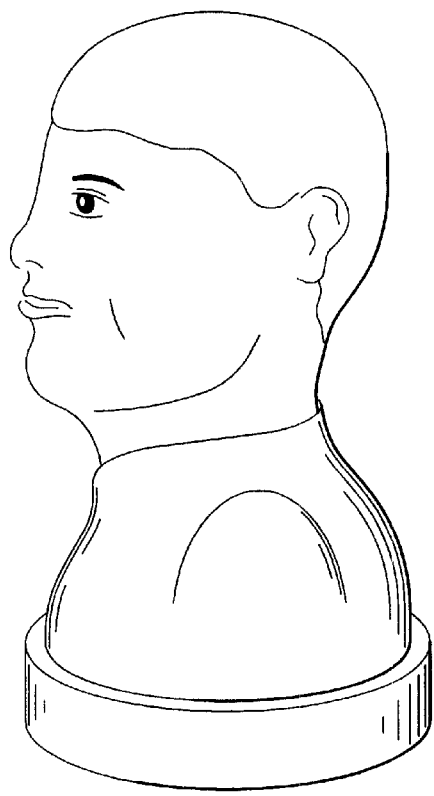
Figure 7:
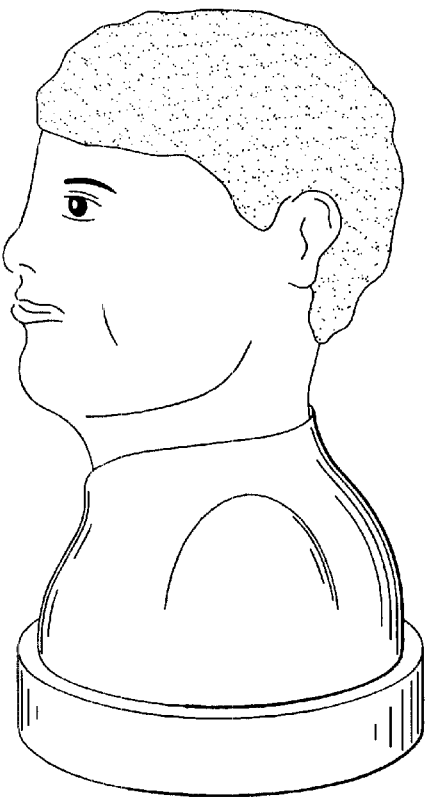

A—Computerization Work
  Digitization of the selected photographs of the person, for example by means of a scanner;
  Montage and digital mixing of the photographs in order to obtain a 360° panned image of the skin of the face;
  Anamorphosis and homothetics of the skin image by means of software;
  Virtual 3D modeling of the person by means of software.
B—Morphological Volume, Bust and Scalp
  Manufacture of the morphological model of the bust and scalp on a numerical reproduction machine on the basis of the 3D model file; (See FIG. 4)
  Touching up of the morphological model or models;
  Manufacture of the injection molds from the model;
  Injection-molding of the morphological volumes, of the bust and of the scalp, by means for example of an injection-molding machine.
C—Skin Texture and Bust
  Printing of the skin image onto the shrinkable support;
  Printing of the bust image onto the shrinkable support; (See FIG. 2)
  Manufacture of the sleeves corresponding to the skin and to the bust; (See FIG. 3)
  Positioning of the sleeves on the morphological volume of the head and on the bust; (See FIG. 5.)
  Shrinkage of the sleeves onto the corresponding volumes of the head and of the bust;
  Symbiosing in terms of the morphology of the head and of the bust, so that the heat-shrinkable film matches the various recessed and relief shapes. (See. FIG. 6)
D—Scalp
  Decoration of the scalp, in particular by painting;
  Securing of the scalp to the head. (See FIG. 7)
E—Plinth
  Manufacture of the plinth;
  Possible cladding of the plinth, if appropriate with the addition of a signature or of a caption, etc.
F—Finishes
  Leveling off of the sleeves at the base of the head and in the upper part of the bust;
  Securing of the head to the bust by snap-fitting, adhesive bonding, welding or the like;
  Fitting of the scalp;
  Fitting of the finished plinth;
  Putting the bust in place, for example in a crystal case.

The bust, as produced according to the characteristics of the invention, can subsequently be conditioned by various methods which are perfectly well known. Likewise, whatever the conditioning chosen, the latter may advantageously be completed by a nameplate of the person in question.

The foregoing description applies more particularly to the manufacture and reproduction of at least part of an individual, specifically essentially his bust, head and scalp. It goes without saying that the method according to the characteristics of the invention applies to the reproduction and manufacture not only of any type of individual, but also of any type of object, its aim being to change from the physical state of a body to virtual data in order faithfully to reproduce a physical object from them in terms of volume and of the surface appearance texture. Essentially, according to the invention, on the basis of a 2D image or photograph previously deformed in accordance with the anamorphosis operation, the latter is subsequently printed onto a support which will form the skin. The support onto which the image or photograph is printed is selected from various materials having the physical property of shrinkage.

The combination of the shrinkage action and of its differential volumetric limitation to a specific shape, in association with the so-called symbiosing action, gives rise to a physical algorithmic law. This law can be parameterized from controlled characteristics of the values of the support, the shapes of the morphometric volume, and the conditions of shrinkage application and of the symbiosing action.

The advantages become clearly apparent from the description. In particular, it is stressed and recalled that the statuettes, busts or figures obtained as a result of the method correspond with the greatest possible fidelity to a real three-dimensional image of authentic persons in reduced form.

What is claimed is:

1. A method of manufacturing a three dimensional reproduction of an article having recesses and relieve shapes the includes the steps:

produducing data files from photographs of the article from which volumetric body information and skin color and texture information can be devised, digitizing the information contained in the data files;

producing a volumetric body from the digitized information;

creating an anamorphoses image from the same information used to produce the volumetric body, said image being a function of the physical characteristics of the volumetric body;

placing the anamorphosed image upon a sheet of shrinkable material; and symbiosing the imaged heat shrinkable material onto the volumetric body by shrinking the material onto the body so that the anamorphosed image becomes undistorted to produce a faithful isotropic reproduction of the article.

2. The method of claim 1 that includes the further step of shaping the imaged heat shrinkable sheet into a tubular sleeve prior to applying the sheet to the volumetric body.

3. The method of claim 1 wherein the anamorphosed image is applied to the shrinkable material by a photographic printing technique.

4. The method of claim 3 that includes the further steps of producing a die of the volumetric body and injecting molding a plurality of volumetric bodies from said die whereby a number of reproductions can be manufactured.

5. The method of claim 1 wherein the article is a human bust and the anamorphosed image is a skin image.

* * * * *